Sept. 19, 1961  A. F. THIELEN, JR  3,000,058
METHOD OF FABRICATING REFRIGERATOR DOORS
Filed Oct. 19, 1956  2 Sheets-Sheet 1

INVENTOR.
ALBERT F. THIELEN, JR.
BY
AGENT

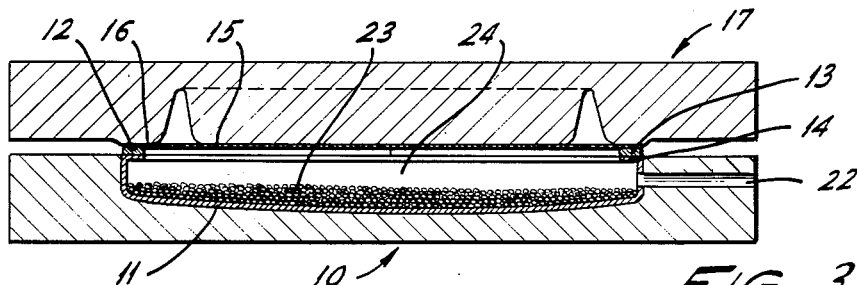
FIG. 3.
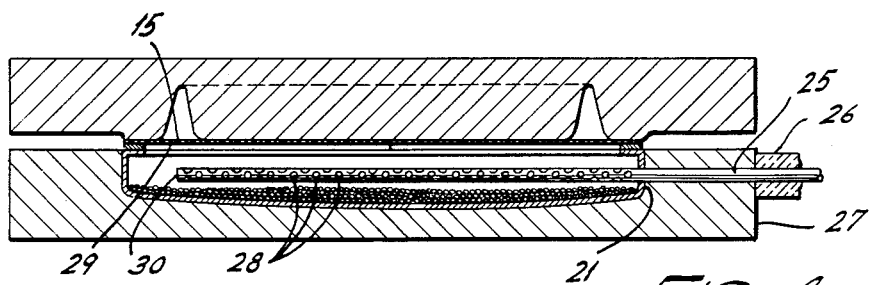
FIG. 4.
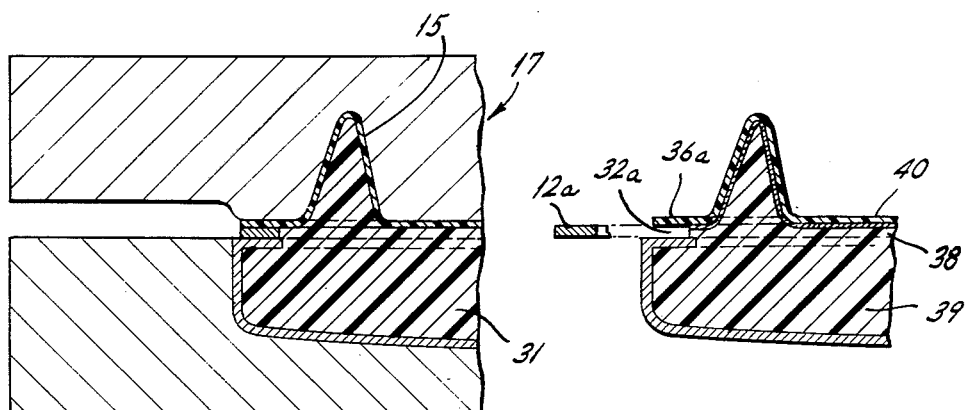
FIG. 5.
FIG. 7.
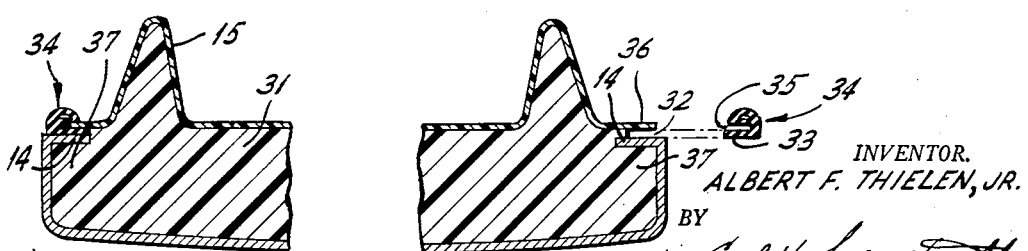
FIG. 6.
INVENTOR.
ALBERT F. THIELEN, JR.
BY
AGENT

United States Patent Office 3,000,058
Patented Sept. 19, 1961

3,000,058
METHOD OF FABRICATING REFRIGERATOR DOORS
Albert F. Thielen, Jr., Melrose Park, Pa., assignor to Philco Corporation, Philadelphia, Pa., a corporation of Pennsylvania
Filed Oct. 19, 1956, Ser. No. 617,037
2 Claims. (Cl. 18—59)

This invention relates to a method of molding and to the articles of manufacture produced by said method.

While the invention is of broader applicability, it is particularly useful in the fabrication of structures exemplified by the preferred embodiment, and it is in this field of application that the method and apparatus concepts of this invention are illustrated and described.

It has been the practice in the fabrication of refrigerator doors to begin fabrication with a metal outer shell and a plastic door liner which have been performed and, prior to manual assembly of the shell and liner, to hand insert batts of insulation therebetween. This practice has proved to be time consuming, and in applications where intricate liner shapes are employed—as is the trend in present day design—may be unsatisfactory, in that the insulation may not conform properly to the convoluted contours of these premolded components, resulting in uninsulated voids and consequent reduction in operating efficiency. Moreover, the liner constitutes an independent structural member, as does the door panel, and consequently must have greater individual strength and rigidity than is required when practicing the method concepts of this invention. In addition, the independence of the structural members comprising the refrigerator door necessitates the additional step, referred to above, of manually fastening the constituent members into a unitary structure, a technique which is not readily adaptable to mass production techniques and is consequently economically undesirable.

It is a broad and primary object of this invention to introduce a new concept in the technique of molding or forming.

It is a more particular object of this invention to combine individual elements constituting parts of an ultimately desired unitary structure, by means of a molding process, into a composite integrated unit, not requiring manual integration of the constituent members.

Another object of the present invention is to combine the heretofore numerous time consuming steps necessary in the fabrication of structure, exemplified by the illustrated embodiment, into a simple economic process which combines the dual functions of molding and fabrication.

It is a still more specific object of this invention to produce a fully insulated refrigerator door comprising an outer shell and inner door liner, with insulating material interposed therebetween, as a composite unitary structure, and with a minimum of manual assembly.

In accordance with the invention, and first briefly describing the preferred practice thereof, the method of fabrication consists of placing a preformed outer shell, for example the shell of a refrigerator food compartment door, into a supporting mold, followed by placement, conveniently on the coplanar internal marginal flange portions of said shell, of a pair of generally U-shaped mating spacer plates, the latter members serving ultimately to provide a peripheral lip for accepting a conventional door gasket. Following this, a light gauge thermoplastic sheet is positioned so as to overlie the concavity of said outer shell, its periphery resting on said spacer plates and pressingly confined thereto by a mold whose face has formed therein the ultimately desired liner configuration.

By next injecting a predetermined charge of expandable material, for example polystyrene beads, within the cavity delineated by said thermoplastic sheet and outer shell, and causing their expansion by any suitable means, the beads will urge the thermoplastic sheet into conformity with the shape defined by the upper die.

An expeditious method of expanding the beads is to use dry steam, this not only serves to effectuate the ultimate coalescing of the individual beads into an integrated foam, but additionally serves to fuse the thermoplastic sheet and plastic foam into a unitary structure. It will be understood, of course, that my invention is not limited to this particular expandable material, as is pointed out hereinafter.

The foregoing and additional objects within contemplation will be clearly understood by reference to the following detailed description in conjunction with the accompanying drawings, in which:

FIGURE 3 is a sectional view of the mold taken along the medial plane, with all elements in place and the mold charged with expandable beads of polystyrene;

FIGURE 4 shows a mode of expanding the plastic beads, comprising the insertion of steam probes within the assembly shown in FIGURE 3;

FIGURE 5 is a fragmentary section of the completed assembly within the mold, depicting the final molded product and the integration of the constituent elements;

FIGURE 6 illustrates the assembly as removed from the mold, with the spacer bars withdrawn and a gasket in place; and FIGURE 7 depicts an alternate embodiment showing the use of an intermediate layer of bonding material used to unify the individual members and thus to form a composite assembly.

Figure 1:
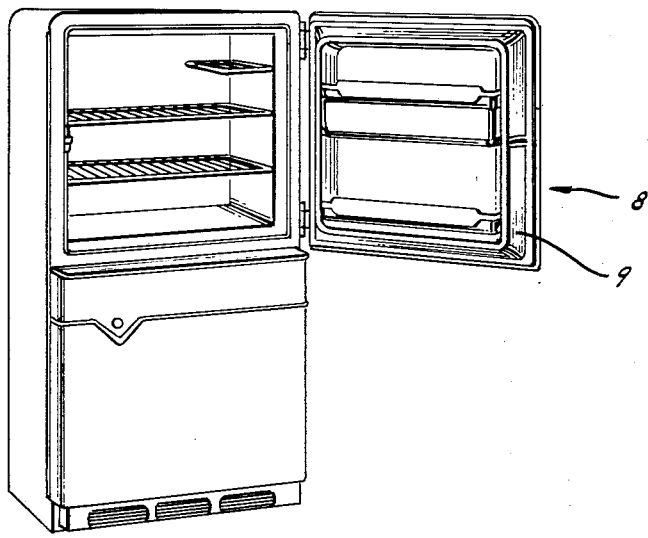
FIGURE 1 is a perspective view of a refrigerator embodying features of this invention.

Referring to the drawings, FIGURE 1 depicts a two door-combination refrigerator freezer 8, of the type having an intricately shaped door liner 9, a type of door construction to which the method concepts and mode of fabrication herein described and claimed have particularly advantageous application.

Figure 2:
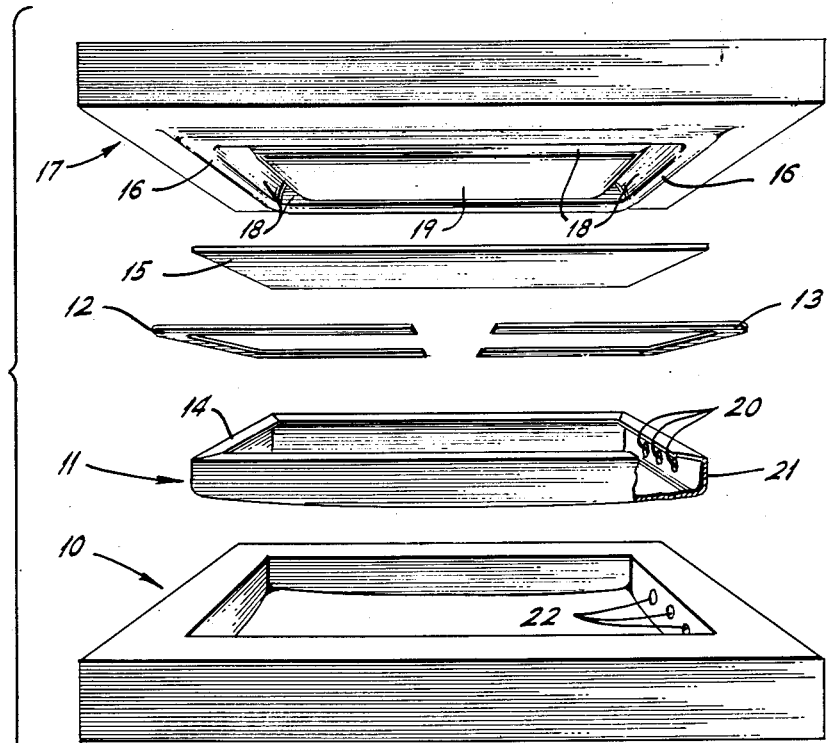
FIGURE 2 is an exploded perspective of the fabricating mold and constituent parts as described with reference to the preferred embodiment.

This new method of fabrication may best be explained by detailed reference to FIGURE 2, taken in conjunction with FIGURE 3. The former illustration shows an exploded view of the molding means, and certain of the constituent elements utilized in the fabrication of this new article of manufacture. FIGURE 3 is a sectional view taken through the medial plane of the assembled structure with all elements in place, and clearly depicts the interrelation of the constituent parts, additionally showing the initial charge of expandable polystyrene beads.

The forming means comprises the door support form or mold 10, which houses the outer shell 11 and serves to maintain the shape of this preformed member during the subsequent fabrication process, and the liner forming mold 17. Following the positioning of the outer shell 11 within the support mold 10, the spacer strips 12 and 13, whose function will be described more fully later, are placed in contact with the peripheral flange 14 of the outer shell 11. These spacing strips are made in two more or less symmetric sections to facilitate their removal at the completion of the forming phase. Immediately overlying said strips 12 and 13 is a thermoplastic sheeet 15—in the present instance a polystyrene sheet—its entire marginal area being held in intimate contact with said spacers by the abutting portions 16 of the door liner forming mold 17. The mating face of this liner forming mold contains the depressed portions 18 which, in cooperation with the flat portion 19, delineate the desired configuration of the finished door liner.

With the thermoplastic sheet 15 and spacer plates 12 and 13 in position, the upper forming mold 17 is secured relative to the outer shell support form by means well known in the art, which means have not been shown. Following this, a prescribed quantity of expandable polystyrene beads are injected through the charging ports 22 and the apertures 20 communicating therewith, into the mold cavity 24, the quantity being dependent on the density ultimately desired. Next, a plurality of foraminated steam probes 25 (one of which is shown in FIGURE 4), communicating with a steam chest (not shown) are inserted through the charging ports 22 into the cavity 24, the steam jacket 26, when brought into abutment with the vertical side wall 27, serving to both insulate the probes and locate same within the mold cavity. Dry steam is then injected into the recess of the mold through minute holes 28 in the steam probes 25. Molding or deforming of the member 15 is an extremely simple process since the operation is essentially carried out at low pressure. In the presently described embodiment heat is applied to bring about expansion of the plastic beads, the choice of the method of inducing expansion being dependent on the thickness and shape of the finished product and the time available for expansion. The injection of dry steam into the mold cavity is a very desirable heating method from the standpoint of economy and adaptability. Steam pressures ranging from 10 to 30 lbs. per sq. inch have been found satisfactory, the internal expansion pressure necessarily being a function of density. Cavity temperatures varying from 100–140° C. have been used very successfully, and I have found that higher temperatures have a tendency to cause collapse of the molded article after expansion. On the other hand, lower temperatures may not be conducive to rapid enough heat transfer to accomplish expansion within a reasonable time.

The exact temperature and pressure of the heating medium, in a specific application, is dependent upon the configuration of the article ultimately desired, and upon the particular materials used, and consequently can best be determined empirically, the above noted temperatures and pressures being merely illustrative of the general range and in no way limative thereof.

As heat is applied, the individual beads of expandable polystyrene from a myriad of minute individual closed cells having sizes of hte order of .002 to .006 inch. The heat which causes expansion of the beads also results in their coalescing, thus forming a unitary body of non-connecting internal cell structures. It is this structure of individual non-connecting cells which accounts for the low thermal conductivity, low water absorption and low water vapor permeability of this material, and makes it ideally suited to its present field of application. It is, of course, contemplated that numerous types of expandable formed plastics may be employed, for example, to mention a few, phenolic, styrene, vinyl and isocyanate, in addition to the reactant type plastic mixtures, as exemplified by alkyd-resin-meta-toluene-diisocyanate. Moreover, the term "foam plastic" is not meant to denote a specific material but is meant to be inclusive of all substances capable of being cellularly expanded, or substances otherwise expandable, which result in a product having substantially similar qualities. It is furthermore recognized that the method concepts of the present invention are applicable to the forming, molding or deformation of material other than the thermally plastic group of which the polystyrene sheet, constituting the preferred material in the illustrated embodiment, is exemplary.

In some applications it may be desirable to charge the mold with partially pre-expanded beads, as when molding large pieces of irregular shape or pieces of a density less than about 2.0 lbs. per cubic ft., since unexpanded beads will not generally swell sufficiently to completely fill a narrow, vertical space. It is therefore necessary in applications of this nature to initially fill the area with the pre-expanded beads followed by application of heat. This additional step will insure a fully insulated assembly.

Expandable beads of polystyrene may be partially pre-expanded by exposing the beads to a dry heat, as for example that resulting from infra-red bulbs or strip heaters. The beads when treated in this manner do not coalesce but retain their individual cellular configuration during expansion, each bead increasing to a controlled volume depending on the amount of heat applied. Beads thus expanded consequently remain free flowing and capable of being poured or blown into a mold.

In the illustrated embodiment, the polystyrene beads, as previously mentioned, are controllably expanded through the application of heat. The thermoplastic sheet 15 is softened prior to reaching its fusion point and the advancing wall of polystyrene foam and the surface 29 of the thermoplastic sheet 15 are brought into mutually contiguous abutment, the pressure resulting from the expanding beads serving to press the plastic sheet into conformity with the contours in the face of the liner forming mold 17. As the point of fusion is reached, the continued resilient pressure of the polystyrene foam causes the sheet of polystyrene and the plastic foam to unite, forming a unitary fused structure. Just prior to completion of the expansion phase, the steam probes 25 are withdrawn; this is possible since the polystyrene foam and probes have no affinity for each other, and the residual heat within the cavity 24 serves to complete the expansion cycle, closing the cavity left by the withdrawn steam probes. To prevent the extrusion of foam through the charging ports 22, the steam probes are withdrawn so as to position the terminal portions 30 outside of, but adjacent to, the door panel base portion 21, thereby additionally allowing closure of the aperture 20 by the expanding foam.

Following the expansion phase, the assembly is cooled to prevent swelling of the foam subsequent to opening of the mold. There is thus insured a dimensionally stable product and, as illustrated in FIGURE 5, one which contains no uninsulated areas; the polystyrene 31 foaming into and filling all the contours delineated by the liner forming mold. The mold is then separated and the unitary structure shown in FIGURE 6 is removed. The spacer plates 12 and 13 are then withdrawn, thereby providing a peripheral cavity 32, which is adapted to receive the flange portion 33 of the gasket 34. This construction enables the gasket channel portion 35, when the gasket is distended, to be snapped over the coplanar external marginal flange portion 36 of the door, the resilience of the gasket serving to secure it firmly in place.

An advantageous feature of this mode of fabrication is the interlocking function performed by the coplanar internal marginal flange portions 14 of the outer shell 11. As the polystyrene beads expand and coalesce into a unitary fused mass of plastic foam, they are mechanically interlocked to the outer shell by entrapment thereof within the shell's peripheral area 37 bounded by the aforesaid flange portion 14, this serving to anchor the aforesaid integral mass to the outer shell thereby obviating the need for separable fastening means. This union of members brought about by and during the expansion phase, in combination with the fusion of the expanded core 31 and inner door liner 15, results in obviating the manual interconnection of constituent members. This merging of the molding and fabrication processes provides an article of manufacture characterized by structural simplicity and adaptability to mass production techniques.

Alternative practice shown in FIGURE 7 contemplates interposing a layer of bonding material 38 between the expandable substance 39 and the material 40, which latter material need not necessarily be thermoplastic but merely capable of being formed by the forces exerted by the dilating mass of expandable plastic, the term deformable when used to describe such material signifying this particular characteristic. The aforesaid layer of adhesive or bonding material may be applied to the under surface of the material 40 prior to the expansion phase, and can be any suitable, commercially available adhesive. If the material 40 is a non-porous material, such as a metal or laminated plastic, an adhesive which cures by chemical reaction is preferable, as for example the epoxy, phenol-formaldehyde and urea-formaldehyde types. If on the other hand the material 40 be of a porous nature, such as wood, paper or fiberglass, an emulsion or latex type of adhesive is desirable. This listing does not purport to be exhaustive but merely illustrative of the broad class of materials encompassed by the teaching of this alternate embodiment. It will also be apparent that numerous configurations embodying the teaching of this invention may be resorted to. However, it will be understood that while preferred embodiments of the invention have been depicted and described, the appended claims contemplate such changes and modifications as come within the essential spirit of the present invention.

I claim:

1. In fabricating insulating structure having a preformed, dished-outer shell and an inner plastic liner cooperatively housing an expanded cellular core of insulative material, the method which comprises: providing a shell configured to mechanically interlock with said core during its expansion; disposing within the cavity defined by said shell a charge of "foam plastic" material; interposing a thermoplastic member of generally sheet-like configuration between said material and a surface delineating the shape ultimately desired of said member; and introducing heat both to expand said material and to plasticize said member sufficiently to permit it to be molded by the expanding core in conformity with the shape delineated by said surface.

2. In fabricating insulating structure having a preformed, dished outer shell and an inner plastic liner cooperatively housing an expanded cellular core of insulative material, the method which comprises: providing a shell configured to mechanically interlock with said core during its expansion; disposing within the cavity defined by said shell a charge of "foam plastic" material; interposing a thermoplastic member of generally sheet-like configuration between said material and a surface delineating the shape ultimately desired of said member; and applying heat concurrently to expand said material and to plasticize said member sufficiently to permit it to be formed by the expanding core into a shape delineated by said surface, and to produce coalescing of said member and expanded core thereby automatically to effect integration of the structure's component parts.

References Cited in the file of this patent

UNITED STATES PATENTS

| | | |
|---|---|---|
| 1,565,582 | Moore | Dec. 15, 1925 |
| 2,106,840 | Gould | Feb. 1, 1938 |
| 2,185,689 | Jensen | Jan. 2, 1940 |
| 2,240,581 | Seward et al. | May 6, 1941 |
| 2,247,337 | Raflovich | June 24, 1941 |
| 2,538,406 | Allen | Jan. 16, 1951 |
| 2,552,641 | Morrison | May 15, 1951 |
| 2,705,211 | De Wyk | Mar. 29, 1955 |
| 2,744,340 | Gerber | May 8, 1956 |
| 2,753,642 | Sullivan | July 10, 1956 |
| 2,767,436 | Noland et al. | Oct. 23, 1956 |
| 2,801,199 | Meyers | July 30, 1957 |
| 2,806,812 | Merz | Sept. 17, 1957 |